United States Patent [19]

Herrmann et al.

[11] Patent Number: 4,814,669

[45] Date of Patent: Mar. 21, 1989

[54] METHOD OF DETERMINING THE POSITION OF AN ELECTRON BEAM IN A SHADOW MASK DISPLAY TUBE

[75] Inventors: Jochem Herrmann; Erwin O. F. Siefken, both of Eindhoven, Netherlands

[73] Assignee: U.S. Philips Corporation, New York, N.Y.

[21] Appl. No.: 164,048

[22] Filed: Mar. 4, 1988

[30] Foreign Application Priority Data

Mar. 6, 1987 [GB] United Kingdom ............... 8705306

[51] Int. Cl.$^4$ ............................................. H01J 31/26
[52] U.S. Cl. ....................................... 315/10; 358/10; 358/69
[58] Field of Search ...................... 315/10; 358/69, 10

[56] References Cited

U.S. PATENT DOCUMENTS 4,352,047  9/1982  Imayasu et al. ....................... 358/69
4,364,083  12/1982  Isono et al. ............................ 358/69

*Primary Examiner*—Theodore M. Blum
*Attorney, Agent, or Firm*—John C. Fox

[57] ABSTRACT

A fast method of determining the position of an electron beam in a shadow mask display tube and has particular application to measuring the convergence of electron beams in color display tubes. A camera is positioned against a color display tube faceplate, the objective lens of the camera covering 10 to 12 triplets of phosphor elements on the screen. The electron beams are modulated with a video signal having a spatial frequency which is slightly different from either the spatial frequency of the color selection electrode or, preferably, half the spatial frequency of the color selection electrode, and the luminance values of the microspots of each color are sampled at the phosphor pitch. Measuring the geometrical positions of the respective beat waveforms of the three colors provides an indication of the misconvergence of the electron beams at the screen. The actual values can be calculated by dividing the distances by a scaling factor which is a function of the ratio of the video frequency wavelength to the beat frequency wavelength.

12 Claims, 3 Drawing Sheets

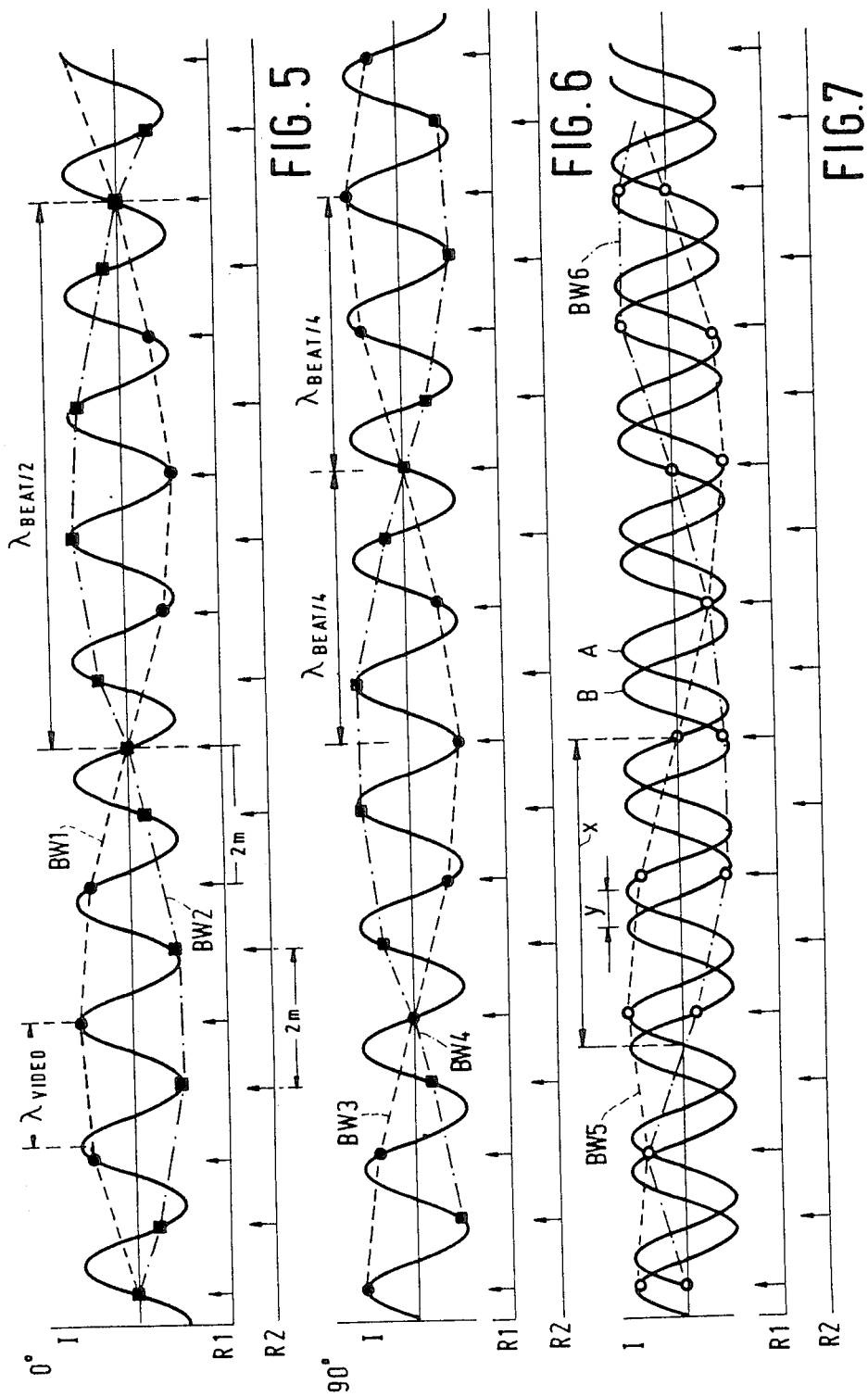

METHOD OF DETERMINING THE POSITION OF AN ELECTRON BEAM IN A SHADOW MASK DISPLAY TUBE

BACKGROUND OF THE INVENTION

The present invention relates to a method of determining the position of an electron beam in a colour selection electrode display tube. Such a method has particular, but not exclusive, application in setting-up convergence of the three electron beams in a colour selection electrode display tube. By convergence is meant that the images produced by the three electron beams should coincide at the cathodoluminescent screen normally provided on the inside of the optically transparent display window. The ever present demand for improved colour display on cathode ray tubes, especially in high definition tubes used for datagraphic displays requires ever more critical setting-up of convergence. Simultaneously the task has to be completed in a short time in order for it to be acceptable economically.

The problem in determining the convergence errors is that the apertures in the colour selection electrode only provide a sampled view of the image on the screen.

A known technique for measuring static and dynamic convergence errors is described in U.S. Pat. No. 4,441,120, issued Apr. 3, 1984. This known technique requires the use of a detector comprising at least one photosensitive cell which is composed of at least two separate photosensitive surface parts which are situated symmetrically relative to the centre of the cell. The photosensitivity of said photosensitive surface parts increases substantially linearly from the centre of the cell. In use, optical elements project light from a local area of the display screen on to the photosensitive surface parts of the photosensitive cell. Means are provided for establishing the difference in the amount of light on the photosensitive surface parts. These differences are used to set-up the correct static convergence of the display tube by means of magnetising at least one permanently magnetisable ring carried by the electron gun as a multipole. This known technique is accurate and provides satisfactory results. However the measurements and adjustments require a relatively long time to complete and in order to speed-up the manufacture of television display tubes it is desired to reduce the time taken to implement the various stages of tube manufacture. With this overall objective in mind the time required for convergence adjustments should be reduced.

SUMMARY OF THE INVENTION

According to one aspect of the present invention there is provided a method of determining the position of an electron beam in a shadow mask display tube, characterized in that the method comprises determining coarsely the position of the electron beam and making a more accurate determination of the position of the electron beam by intensity modulating the electron beam with a video signal having a spatial frequency which is different from the spatial frequency of the colour selection electrode or a sub-multiple of the spatial frequency of the colour selection electrode, optically sampling the luminance values of microspots of the trace produced at the cathodoluminescent screen by electrons from the electron beam passing through respective apertures of the shadow mask, and calculating on the basis of these luminance values the accurate position of the beam.

The spatial frequency of the video signal is preferably slightly different from the spatial frequency of the colour selection electrode or a sub-multiple of the spatial frequency of the colour selection electrode. This simplifies the determination of the accurate position.

By modulating the electron beam produced by the electron gun assembly with a video signal having a spatial frequency slightly different from the spatial frequency of the colour selection electrode or a submultiple of the spatial frequency of the colour selection electrode a variation is produced in the intensity of the luminance of the microspots. From this variation a beat frequency waveform is, in an example of the method, simulated by curve fitting to the intensity of the luminance of microspots in the trace, or from a suitably constructed parameter from the intensity of the luminance of the microspots. From this beat frequency waveform the position of the electron beam is determined.

According to another aspect of the present invention there is provided a method of measuring the horizontal convergence in a colour display tube having an envelope formed by a faceplate, a cone and a neck, a cathodoluminescent screen formed by triplets of different colour emitting phosphors, a colour selection electrode and an in-line electron gum assembly in the neck for producing three electron beams, characterized in that the method comprises determining coarsely the distances between the first central electron beam and each of the outer second and third electron beams, contemporaneously amplitude modulating the electron beam produced by the electron gun assembly with a video signal having a spatial frequency different from the spatial frequency of the colour selection electrode or a sub-multiple of the spatial frequency of the colour selection electrode to produce a first set of traces, optically sampling at the phosphor pitch the luminance values of the microspots produced by the respective elements of the triplets in response to electron impingement, and determining on the basis of said luminance values the accurate relative position of the beams.

The spatial frequency of the video signal is preferably slightly different from the spatial frequency of the colour selection electrode or a sub-multiple of the spatial frequency of the colour selection electrode. This simplifies the calculation of the accurate relative positions.

By modulating the electron beam produced by the electron gun assembly with a video signal having a spatial frequency slightly different from the spatial frequency of the colour selection electrode or a submultiple of the spatial frequency of the colour selection electrode a variation is produced in the intensity of the luminance of the microspots. From this variation beat frequency waveforms are, in an example of the method, simulated by curve fitting to the intensity of the luminance of microspots in the set of traces, or to a suitably constructed parameter from the intensity of the luminance of microspots. From the relative positions of these beat frequency waveforms, i.e. the phase difference between waveforms, the accurate relative positions of the electron beams are determined.

In implementing the different aspects of the present invention the choice of the spatial frequency of the video signal depends on the quality of focussing of the beam spots. In the event of a poorly focussed electron beam or poorly focussed electron beams the spatial frequency of the video signal is selected to be slightly different from a submultiple, such as $\frac{1}{2}$, $\frac{1}{3}$ or $\frac{1}{4}$ ... $1/n$ (where n is an integer equal to or greater than 2), of the spatial frequency (of the colour selection electrode). In general the worse the focussing of the spot the lower the submultiple.

When using a video signal with a spatial frequency of approximately half the spatial frequency of the colour selection electrode the accuracy of measurement of the position of the beat frequency waveforms can be improved by two antiphase beat frequency waveforms being produced from the odd numbered and the even numbered luminance values of the microspots of each colour. The zero cross-overs of the antiphase that frequency waveforms are detectable with a greater precision that the maximum or minimum at which the rate of change is zero. The accuracy of measurement of the position of the beat frequency waveforms can be improved yet further by producing a second contemporaneous set of traces using a video signal shifted in phase by 90° with respect to the video signal used to produce the first set of traces. By producing pairs of antiphase beat frequency waveforms from the luminance values of the second set of traces, then for any one colour the distance between the cross-over of the first beat frequency waveforms and the corresponding phased cross-over of the second beat frequency waveforms is equal to a quarter of the beat frequency wavelength.

The number of beat frequency waveforms which can be provided is dependent on the particular submultiple 1/n of the spatial frequency of the shadow mask. Generally n beat frequency waveforms with a phase difference of 360/n degrees can be produced.

BRIEF DESCRIPTION OF THE DRAWINGS

The present invention will now be described in greater detail, by way of example, with reference to the accompanying drawings, in which FIGS. 5 through 10 are waveform diagrams for explaining the method of calculating the Vernier correction to be made to the coarse measurement.

DESCRIPTION OF THE PREFERRED EMBODIMENTS

Figure 1:
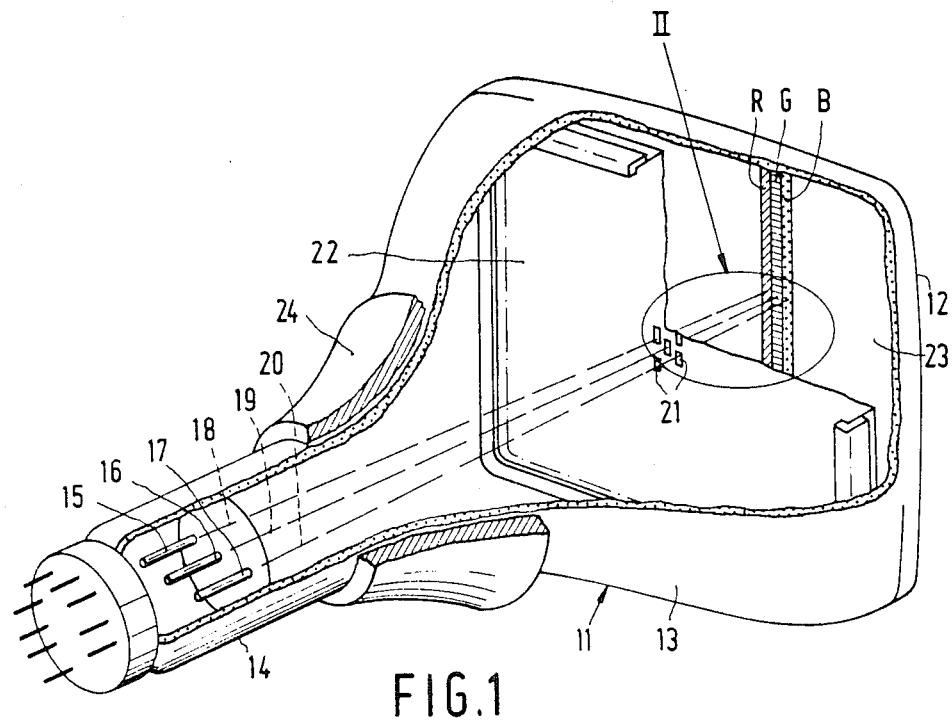
FIG. 1 is a perspective view, partly broken away, of a shadow mask colour display tube of the "in-line" electron gun type.
Figure 2:
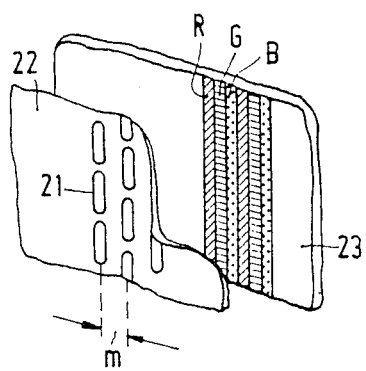
FIG. 2 is an enlarged perspective view of the encircled part II of FIG. 1.

FIG. 1 is a perspective view, partly broken away, of a colour display tube of the "in-line" gun-type. The tube is composed of a glass envelope 11 consisting of a display window 12, a cone 13 and a neck 14. Three electron guns 15, 16 and 17 situated in one plane in the neck generate three electron beams 18, 19 and 20. These electron beams enclose a small angle with each other, the so-called colour selection angle, and pass through apertures 21 in a shadow mask or colour selection electrode 22 which is adjacent to, but spaced from, the inside surface of the display window 12. A cathodoluminescent display screen 23 which consists of a large number of triplets of red, green and blue light emitting elements R, G, B, is present on the inside of the display window 12. The convergence of the electron beams 18, 19, 20 should be such that their centre axes coincide at the screen 23. The vertical rows of apertures 21 in the colour selection electrode are parallel to the direction of elongation of the phosphor elements as is visible in FIG. 2. For each aperture 21 in the colour selection electrode 22 there is an associated triplet of phosphor elements. Since the electron beams enclose a small angle with each other, the electron beam 20, when the tube is properly adjusted for colour purity, impinges only on the red phosphor elements R. The electron beam 19 impinges only on the green phosphor elements G and the electron beam 18 impinges only on the blue phosphor elements B. The horizontal pitch, m, of the mask, green to green, depends on the screen size but for a 26 inch diagonal tube, m typically=0.8 mm.

Figure 3:
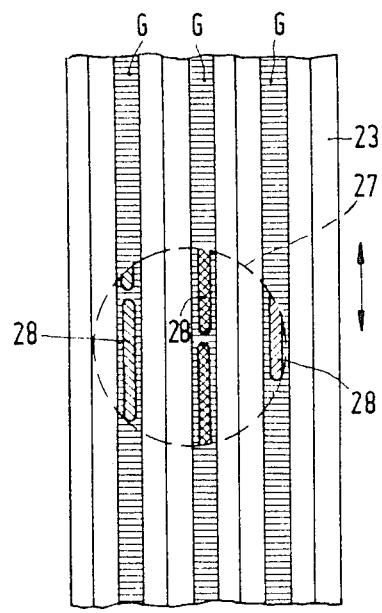
FIG. 3 is a diagram which shows the microscopic structure of a spot on the display screen.

FIG. 3 shows a spot 27 of electron beam 19 on the display screen 23. The spot has a diameter of 2 to 3 mm and the phosphor elements are approximately 270 μm wide. The apertures 21 in the shadow mask are projected on the phosphor elements by the electron beam. As a result of this the beam spot at the screen has a microscopic structure consisting of microspots 28. In colour display tubes, the pictures displayed by the three electron beams in the three basic colours must coincide accurately on the display screen over its entire area, in other words, the three electron beams must converge throughout the display screen. Consequently in order to be able to correct for both static and dynamic convergence it is necessary to be able to measure the convergence errors at the screen. While the method is exemplified here with respect to a colour display tube comprising a shadow mask, the method may also be applied for colour display tubes comprising a different type of colour selection electrode, e.g. a grid-formed colour selection electrode.

Figure 4:
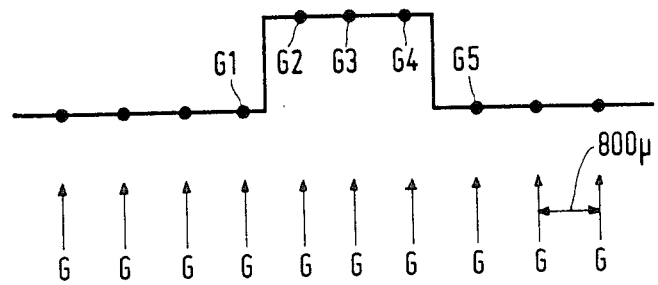
FIG. 4 is a diagram explaining the coarse measurement of the position of the electron beam spot.

The method in accordance with the present invention comprises two main stages, firstly to make a coarse measurement of the position of the electron beam and secondly to modify the coarse measurement by a Vernier correction. The position of the electron beam can be measured with respect to an arbitrary reference point, for example the off-screen horizontal synchronising pulse, or alternatively by treating one electron beam, such as the central green electron beam, as a reference beam. The coarse measurement comprises projecting a spot on a screen by modulating an electron beam with a signal which steps the beam intensity for a low value to a high value and later steps back to the low value or a signal which ramps-up from a low to a high value and ramps-down again, the ramping being done at precisely known rates. FIG. 4 illustrates the use of a stepped waveform for coarse measurement. It will be assumed that the green electron gun has been modulated by a square wave signal and the pitch of the microspots produced by the green phosphor elements in response to the electron beam modulation is 800 μm corresponding to the pitch of the shadow mask 22. From a monitoring position formed by the camera on the outside of the faceplate, a viewer will note the low luminance value of microspot G1, three successive high luminance values of microspots G2 to G4 followed by a succession of microspots having low values the first one of which is G5. The peak brightness or the middle of the beam spot, which may be regarded as the true position of the electron beam, lies somewhere between G1 and G5 and if it is assumed to be the median position then the limits on the accuracy of this assumption are ±400 μm.

As mentioned the second stage in this process is to make a Vernier type of correction of the coarsely determined position of peak brightness. In this second stage the electron beam is intensity modulated with a video signal having a spatial frequency which for a well focussed electron spot is slightly different from the spatial frequency of the colour selection electrode and for a less well focussed electron spot is slightly different from a submultiple, for example, ½ or ⅓ of the spatial frequency of the colour selection electrode. Beat waveforms can be simulated by curve fitting to the intensity of the luminance of the microspots produced by the electron beam. The Vernier measurement relies on the feature that by shifting the video signal by one wavelength, the beat frequency waveform will shift by its own wavelength which is much longer than the wavelength of the video signal frequency. In practice, using a video signal having a frequency of the order of half the spatial frequency, then the beat frequency wavelength is approximately 20 times the phosphor pitch, thus the position of the modulated beam is amplified by a scaling factor. This scaling factor is a ratio of the beat frequency wavelength to the video signal frequency wavelength. The video signal frequency wavelength may drift with time and therefore is best regarded as being of an unknown arbitrary frequency. Accordingly in order to determine the scaling factor it is necessary to measure those factors which can be determined reliably. The phosphor pitch is known from the technical specification used in etching the shadow mask sheet but if it is not known it can be readily measured. Additionally the beat frequency wavelength can be measured, as described in following.

As mentioned above the electron beam is intensity modulated by a video signal having a spatial frequency which is slightly different from the spatial frequency of the colour selection electrode or a multiple or sub-multiple of that frequency, the selected frequency being determined in response to the quality of focusing of the electron beams. If for example the electron beams are poorly focused and the spatial frequency of the video signal is selected close to the spatial frequency of the colour selection electrode then the amplitude of the beat frequency is too low to work with. This problem can be mitigated by choosing a spatial frequency of the video signal which is slightly different from a submultiple of the spatial frequency of the colour selection electrode, for example ½, ⅓ or ¼. Another aspect of choosing a lower video signal frequency is that the video amplifiers can amplify say a 6 MHz signal better than say a 12 MHz one.

In the following example of the measuring method the electron beams are intensity modulated by a video signal having a spatial frequency slightly different from half the spatial frequency of the shadow mask. The amplitudes of the luminances of the respective microspots are treated as samples of the signals scanning the screen. The microspots or samples relating to each colour are grouped into odd and even numbered groups R1, R2, respectively. FIG. 5 shows in graphical form the intensity of one such electron beam as a function of the position. The modulating video signal is indicated as the higher frequency sine wave and is shown by a continuous line. The upstanding arrows in FIG. 5 indicate the positions of the microspots. The distance between the microspots within a group ($R_1$ or $R_2$) is twice the horizontal path m as is indicated in FIG. 5. The video signal has a wavelength $\lambda_{video}$. The intensity or amplitude of the luminance of microspots of group $R_1$ is indicated in FIG. 5 by filled circles, the intensity of the luminance at microspots of group $R_2$ is indicated by filled squares. By curve fitting to the intensity of the luminance at the microspots of group $R_1$ a beat waveform BW1 is produced, as shown in broken lines. A beat waveform BW2 shown as a chain-dot line is produced by curve fitting to the intensity of the luminance at the microspots of group $R_2$. The distance between two successive cross-overs of the beat waveforms corresponds to $\lambda_{beat}/2$, where $\lambda_{beat}$ is the wavelength of the beat frequency.

Searching for the zero crossings is preferred to searching for the maximum or minimum luminance value because the gradient at those latter points is zero whereas the gradient at the zero crossings is at a maximum. Hereby is increased the accuracy with which both the wavelength and the position of the beat frequency waveform is measured.

The accuracy of measurement of position and wavelength of the beat frequency waveform can be improved further by providing a second trace (FIG. 6) in which the video modulation has been phase shifted by 90° relative to that in FIG. 5 and in which sampling is carried out in the same way. Curve fitting to the intensity of the luminance at respectively the odd group $R_1$ and even group $R_2$ microspots will produce the beat waveforms BW3 and BW4 which are phase shifted by 90° relative to BW1 and BW2 respectively. Measuring the distance between successive zero crossings of the beat waveforms of FIGS. 5 and 6 is always $\lambda_{beat}/4$. By using two 90° phase related video waveforms in this manner the beat frequency can be decreased thereby enabling the accuracy of measurement to be increased.

Searching for the zero crossings is preferred to searching for the maximum or minimum luminance value because the gradient at these latter points is zero whereas the gradient at the zero crossings is at a maximum.

FIG. 7 shows two electron beams A and B, both modulated by a video signal with the same spatial frequency. These electron beams are shifted from each other by a distance Y. A could be for instance the ideal position of the electron beam and B the real. Curve fitting to the luminance for the odd (group $R_1$) microspots produces beat waveforms BW5 and BW6 for electron beams A and B respectively. The beat waveforms BW5 and BW6 are shifted from each other by a distance X. X is much larger than Y. By this method, by measuring X, it is therefore possible to measure the shift Y more accurately. The ratio of X and Y, the scaling factor A is calculated below.

In the present example the video signal spatial frequency is approximately half the spatial mask frequency, and the sampling instants, which are related to the spatial frequency of the mask, are divided into two groups, row R1 in the positions k·2m where k=0, 1, 2, 3 etc. and m is the mask pitch, the even sampling points, and row R2 in the positions k·2m+1, the odd sampling points. The wavelength of the video signal $\lambda_{video}$ is slightly different from twice the mask pitch (2m) and is equal to:

$$\frac{2m}{c} = \frac{2m}{1 + \Delta}$$

The intensity I of the luminance signal at fixed sampling positions X=k·m is:

$$I = I_0\left(1 + \sin\left(c \cdot \frac{\pi}{m} X\right)\right) \qquad (1)$$

where $c = 1 + \Delta$ (with $\Delta$ being small with respect to 1) and $I_0$ is the average intensity.

Substituting for c in equation (1) we get:

$$I = I_0\left(1 + \sin\left(\frac{\pi}{m} X + \frac{\pi\Delta}{m} X\right)\right) \qquad (2)$$

Therefore:

$$I = I_0(1 + \sin(k\pi + k\pi\cdot\Delta)) = I_0(1 + (-1)^k \sin K\pi\Delta) \qquad (3)$$

For even sample points, $I = I_0(1 + \sin k\pi\Delta)$ and for odd sample points $I = I_0(1 - \sin k\pi\Delta)$.

In determining the scaling factor one has to keep in mind that if the video information is shifted one wavelength, the beat frequency will also shift one wavelength (its own). From equation (3) above, the wavelength of the beat signal $\lambda_{beat}$ is equal to $2m/\Delta$. The result is a scaling factor:

$$\lambda_{beat}/\lambda_{video} = A = \frac{1+\Delta}{\Delta}$$

In implementing the measuring method the field of view (H) of a monitoring camera should cover at a minimum $\frac{2}{3}$ of the beat frequency wavelength, that is $H = \frac{2}{3} \times \lambda_{beat} = \frac{2}{3} \cdot 2m/\Delta$ This gives a minimum value for $\Delta = (4/3)\cdot(m/H)$ If for example $H = 10$ mm and $m = 0.8$ mm then $\Delta = 0.107$ and the scaling factor A is:

$$A = \frac{1 + 0.107}{0.107} = 10.3$$

In the event of wanting to known where the electron beam is located, one can determine by successive sampling the coarse position of the electron beam to an accuracy of $\pm m/2$. Substantially simultaneously with estimating the coarse position, another trace is produced which is modulated with the video signal as described previously. Successive sets of samples of the luminance values of the microspots can be used to produce respective pairs of antiphase beat waveforms, for example BW1 and BW2 in FIG. 5.

FIGS. 5 and 6 illustrate the situation when using a single one of the electron beams. However in reality there are three electron beams and for each beam, beat waveforms can be produced by curve fitting between the luminance values of all the odd and all the even samples (or microspots) of each colour.

Figure 8:
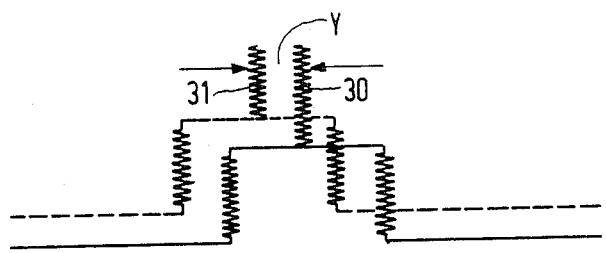

FIG. 8 illustrates the coarse convergence measurement between the green and say the red electron beams, the green electron beam being located as a reference beam. The green trace is shown as a continuous line and the red trace as a broken line. The zig-zag lines linking the low and high values of each trace illustrate the uncertainty as to the exact position of the leading and trailing edges. The other zig-zag lines 30, 31 indicate the "mid-point" of each of the high value pulses but which "mid-points" can only be estimated with an accuracy of $\pm m/2$. Hence the convergence error Y is only accurate to $\pm m/2$, so that if Y is estimated to be 1 mm and $m = 0.8$ mm, the actual difference between the green and red beams is between 0.6 mm and 1.4 mm.

Figure 9:
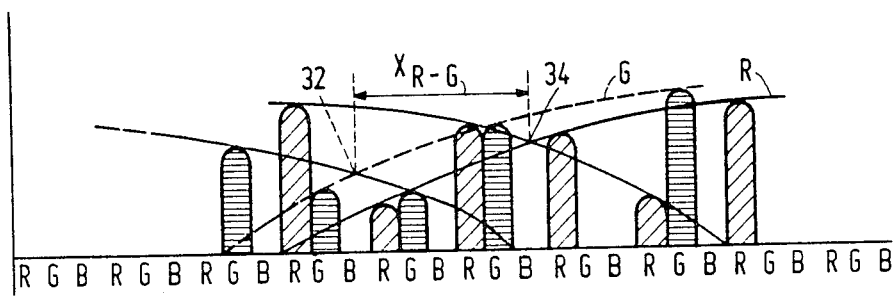
Figure 10:
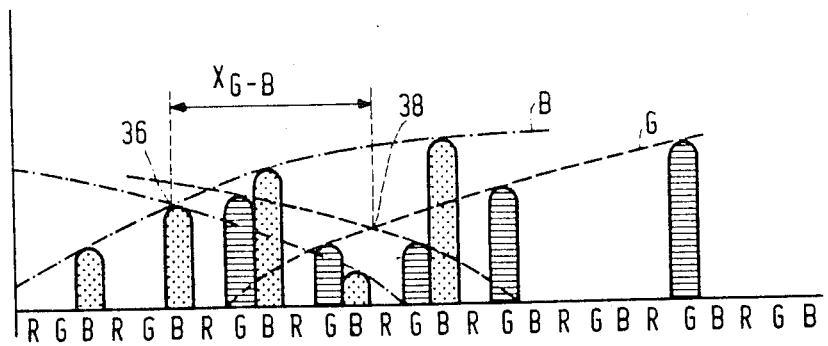

By modulating each of the electron beams with a video frequency waveform of the same phase and frequency and producing beat frequency waveforms as described with reference to FIGS. 5 and 6, it is possible to determine the value of Y with a higher accuracy. For the sake of clarity FIG. 9 shows sampled red and green values and FIG. 10 shows sampled blue and green values and the cross-overs formed by curve fitting. As the green electron beam is normally the central electron beam it is convenient to treat it as the reference beam to which the convergences of the outer, off axis beams are related. Thus by measuring the distance between a cross-over 32 relating to say the green spot G and the corresponding cross-over 34, considered from a phase point of view, relating to the red spot R, the value of $X_{R-G}$ is obtained. The distance $X_{G-B}$ can be obtained in a similar manner. Dividing these values of $X_{R-G}$ and $X_{G-B}$ by the scaling factor A will provide a more accurate value of $Y_{R-G}$ and $Y_{G-B}$. $Y_{R-G} = X_{R-G}/A$; $Y_{G-B} = X_{G-B}/A$.

The coarse measurements are necessary because in reality the beat frequency waveforms will have a plurality of cross-overs 32 and 34 in the X-direction. Therefore there will be a plurality of distance measurements, that is: $X_{R-G}$, $X_{R-G} + \lambda_{beat}$ (where $\lambda_{beat}$ is the beat frequency wavelength), $X_{R-G} - \lambda_{beat}$ and so on; and $X_{G-B}$, $X_{G-B} + \lambda_{beat}$, $X_{G-B} - \lambda_{beat}$ and so on, when the red and blue cross-overs are measured with respect to a single green cross-over. In order to decide which of these values is correct, the respective distance measurements are divided by the scaling factor, and of the quotient values obtained, the value of each which lies in the tolerance range of the coarse measurements for $Y_{R-G}$ and $Y_{G-B}$ is regarded as the correct measurement.

It will be appreciated that the storing of the luminance samples and curve fitting between them can be carried-out in a suitably programmed computer without the necessity of producing visible images. It will also be appreciated that the method of the invention should not be considered restricted to the described examples of curve fitting. In FIG. 5 two different fitted curves BW1 and BW2 are simulated. It is however also possible, for instance, to assign to every element of row $R_1$, as a parameter, not the intensity of the luminance of the particlar microspot, but the difference between the intensity of the luminance of the particular microspot, and the average intensity of the luminance of its two neighboring microspots in row $R_2$, and subsequently to fit a curve BW1' to these parameters. The resulting curve BW1' will have an average value of zero and an amplitude twice as large as the amplitude of curve BW1. Since the amplitude is twice as high, and the average value of the parameters are known, on average the accuracy with which the wavelength and/or position of such a curve BW1' can be measured is greater than for curve BW1. A similar curve BW2' may of course be constructed for the elements of row $R_2$. These curves BW1' and BW2' may then be used to more accurately determine position and/or frequency of the beat frequency waveforms. The same method can of course be applied to construct curves BW3' and/or BW4'. Different curves can be constructed for instance by assigning each microspot a parameter equal to the intensity of the luminance of the particular microspot minus the intensity of the luminance of the neighboring microspot in ascending or descending order times a function that is +1 for a microspot in row $R_1$ and −1 for a microspot in row $R_2$. A fit through these parameters will result in a curve BW1″ similar to BW1′, but shifted ½m, and having twice as many sampling points. Since there are twice as many sampling points the accuracy with which the curve BW1″ can be established is increased. Similar curves BW2″, BW3″ and BW4″ may also be constructed.

If the calculated distances $Y_{R-G}$ and $Y_{G-B}$ are within the permitted statistical deviation then it can be concluded that the three beams are correctly converged at the screen, that is the red and blue beams coincide with the green beam. Otherwise if these distances are unequal and/or they lie outside the statistically determined tolerance range then convergence errors are present.

The convergence measuring technique disclosed may be used in setting-up the static convergence of a display tube by magnetising a multipole field in at least one permanently magnetisable ring mounted on the electron gun. The suitable magnetising method is disclosed in U.S. Pat. No. 4,441,120, details of which are incorporated by way of reference.

What is claimed is:

1. A method of determining the position of an electron beam in a colour selection electrode display tube, characterized in that the method comprises: determining coarsely the position of the electrom beam; determining more accurately the position of the electron beam by intensity modulating the electron beam with a video signal with a spatial frequency which is different from the spatial frequency of the colour selection electrode or a sub-multiple of said spatial frequency; optically sampling the luminance values of microspots of the trace produced at the cathodoluminescent screen by electrons from the electron beam passing through respective apertures of the colour selection electrode; and determining on the basis of these luminance values the accurate position of the beam.

2. A method as claimed in claim 1, in which the spatial frequency of the video signal is slightly different from the spatial frequency of the colour selection electrode or a sub-multiple of said spatial frequency.

3. A method as claimed in claim 1, in which a beat frequency waveform is simulated by curve fitting to the intensity of the luminance of microspots of the trace or to a suitably from the intensity of the luminance of the microspots constructed parameter and the accurate position of the electron beam is determined from this beat frequency waveform.

4. A method as claimed in claim 1, in which the spatial frequency of the video signal is slightly different from the nth submultiple of the spatial frequency of the colour selection electrode, when n is an integer, and provides n beat frequency waveforms with a relative phase difference of 360/n degrees.

5. A method as claimed in claim 4, in which n=2 and there are two antiphase beat frequency waveforms simulated by curve fitting to the intensity of the luminance or the parameter of the odd numbered and the even numbered microspots on the screen.

6. A method as claimed in claim 5, wherein the distance between two successive cross-overs of the two antiphase beat frequency waveforms corresponds to half the wavelength of the beat frequency.

7. A method as claimed in claim 6, in which the method further comprises producing a second trace contemporaneously with the first mentioned trace by modulating an electron beam with a 90° phase shifted version of the video signal, whereby two further antiphase beat frequency waveforms are simulated respectively from the intensity of the luminance or the parameter of the odd and even numbered microspots.

8. A method of measuring the horizontal convergence in a colour display tube having an envelope formed by a faceplate, a cone and a neck, a cathodoluminescent screen formed by triplets of different colour emitting phosphors, a colour selection electrode and an in-line electron gun assembly in the neck for producing three electron beams,
characterized in that the method comprises: determining coarsely the distances between the first central electron beam and each of the outer second and third electron beams, contemporaneously amplitude modulating the electron beams produced by the electron gun assembly with a video signal having a spatial frequency slightly different from the spatial frequency of the colour selection electrode or a sub-multiple of the spatial frequency of the colour selection electrode to produce a first set of traces, optically sampling at the phosphor pitch the luminance values of the microspots produced by the respective elements of the triplets in response to electron impingement, and determining on the basis of these luminance values the accurate relative position of the beams.

9. A method as claimed in claim 8, in which beat frequency waveforms are simulated for each electron beam by curve fitting to the intensity of the luminance of microspots or to a suitably from the intensity of the luminance of the microspots constructed parameter, from which beat frequency waveforms the accurate relative positions of the electron beams are determined.

10. A method as claimed in claim 9, wherein the step of determining the position of each electron beam comprises measuring the distances between corresponding points of the same phase of the beat frequency waveform related to a first and a second of the electron beams and between the first and third of the electron beams.

11. A method as claimed in claim 10, wherein the video frequency is slightly different from a submultiple of the spatial frequency of the colour selection electrode, wherein two antiphase beat frequency waveforms are simulated by curve fitting between all the odd numbered samples and all the even numbered samples of the intesity of the luminance of the parameter of the microspots produced at the screen by each electron beam.

12. A method as claimed in claim 11, in which the method further comprises contemporaneously producing a second set of traces by amplitude modulating the electron beams with a signal at said video frequency but which is phase shifted by 90° with respect to the video signal producing said first set of traces.

* * * * *